United States Patent
Gazapo et al.

(10) Patent No.: US 6,902,828 B2
(45) Date of Patent: Jun. 7, 2005

(54) BRIGHT PRODUCTS OBTAINED BY CONTINUOUS CASTING

(75) Inventors: Jose L. Gazapo, Alicante (ES); Catalina Fernandez Rivera, Alicante (ES); Emilio Sanchez Suarez, Alicante (ES)

(73) Assignee: Alcoa Inc., Pittsburgh, PA (US)

( * ) Notice: Subject to any disclaimer, the term of this patent is extended or adjusted under 35 U.S.C. 154(b) by 196 days.

(21) Appl. No.: 10/276,003

(22) PCT Filed: Apr. 9, 2001

(86) PCT No.: PCT/US01/40477

§ 371 (c)(1),
(2), (4) Date: May 6, 2003

(87) PCT Pub. No.: WO02/081191

PCT Pub. Date: Oct. 17, 2002

(65) Prior Publication Data

US 2003/0165709 A1 Sep. 4, 2003

(51) Int. Cl.$^7$ .................. B32B 15/20; B21C 37/00; B22D 19/00
(52) U.S. Cl. .................. 428/654; 428/687; 428/912.2; 428/925; 428/926; 29/90.01; 148/516; 148/523; 148/535; 148/551; 164/461; 164/91
(58) Field of Search .................. 428/654, 687, 428/912.2, 925, 926; 29/90.01; 72/365.2; 148/516, 523, 535, 551; 164/461, 91; 492/1

(56) References Cited

U.S. PATENT DOCUMENTS

| | | | |
|---|---|---|---|
| 3,963,143 A | 6/1976 | Anderson et al. | 220/64 |
| 4,635,842 A | 1/1987 | Mohondro | 228/175 |
| 4,939,044 A | 7/1990 | Ohashi et al. | 428/654 |
| 5,213,639 A | 5/1993 | Colvin et al. | 148/693 |
| 5,476,725 A | 12/1995 | Papich | 428/654 |
| 5,480,496 A | 1/1996 | Ward | 148/437 |

FOREIGN PATENT DOCUMENTS

| | | |
|---|---|---|
| EP | 067632 A | 12/1982 |
| WO | WO9824571 | 6/1998 |

*Primary Examiner*—Robert R. Koehler
(74) *Attorney, Agent, or Firm*—Gary P. Topolosky; Eckert Seamans Cherin & Mellott, LLC

(57) ABSTRACT

A bright composite sheet product including a roll cast core and a clad material bonded to the core. The core is an aluminum alloy of the AA series 1XXX, 3XXX, 5XXX, or 8XXX, and the clad material contains at least 99.5 wt. % aluminum. The composite sheet products is particularly suited for use in lighting fixtures.

20 Claims, 4 Drawing Sheets

X 32

X 120

X 32

X 120

BRIGHT PRODUCTS OBTAINED BY CONTINUOUS CASTING

FIELD OF THE INVENTION

The present invention relates to clad metallurgical products and to their manufacture, more particularly, bright products produced by laminating a high purity aluminum alloy cladding onto a continuously cast core.

BACKGROUND OF THE INVENTION

Clad aluminum alloy materials for brazing applications having an aluminum alloy core material and aluminum alloy filler material as a surface skin is well known. This material is most commonly formed by superimposing an aluminum alloy plate which serves as a skin material over an aluminum alloy cast ingot which serves as the core material. The filler plate can be applied to one or both surfaces of the ingot. The composite then undergoes hot rolling to bond the two layers together to thicknesses of about 3 to about 10 mm. The clad material is then subsequently cold rolled down to thicknesses of about 0.075 to about 3 mm to obtain brazing sheet. The sheet may be annealed to aid in rolling efficiency or to achieve desired final mechanical properties.

Aluminum brazing sheet is used in a variety of thicknesses, depending on the application. For instance, brazing sheet used in air conditioners have thicknesses ranging from about 1.5 to about 2 mm when being used for support purposes, from 0.5 to 0.65 mm as evaporator plates, from about 0.3 to about 0.4 mm as tube stock (sheet material formed into tubes for carrying fluids, i.e. gases, vapors, and liquids) and from about 0.075 to about 0.15 mm as fin stock (sheet material from which, for instance, radiator fins are made).

More recently, clad brazing sheet has been made by continuously casting the core alloy between a pair of rolls while laminating a sheet (band) of the cladding alloy to the core alloy at the rolls in a system described in U.S. Pat. No. 5,476,725, incorporated herein by reference.

Only certain clad aluminum sheet products have been produced by this method of continuously laminating a cladding band onto a casting core alloy, namely, aluminum brazing sheet. The alloy of the core of a brazing sheet typically is produced from an alloy of the 3XXX or 6XXX Aluminum Association (AA) series and the clad layer generally is an AA 4XXX series alloy. Consequently, the clad layer of aluminum brazing sheet conventionally has a lower solidus temperature (the temperature at which some melting of the material first occurs) than the solidus temperature of the core alloy.

The production of other clad aluminum sheet products, particularly bright aluminum sheet products, is accomplished via the conventional method of roll bonding a clad layer onto a cast ingot of a core alloy. Bright sheet products require that the clad layer be produced from a high purity aluminum alloy (at least 99.5 wt. % aluminum) which has a higher solidus temperature than the solidus temperature of the core. The roll bonded high purity aluminum clad layer may be further finished by electrobrightening and anodizing to achieve a desired reflective finish to the sheet. Bright products should have a minimum of surface defects (dents, scratches or spots) with a high degree of surface brightness and uniformity to ensure good and uniform optical properties of the sheet after anodizing. These properties have heretofore only been achieved by roll bonding the high purity aluminum clad layer to a cast ingot. The cladding ratio (the ratio of the thickness of the clad layer to the total sheet thickness) typically is about 5 to 20%. Uniformity in the cladding ratio along a roll bonded bright sheet in the transverse and longitudinal directions has previously been poor, particularly at higher cladding ratios. While cladding ratios of 5% can be produced with differences of 1% along a roll bonded bright sheet, the degree of nonuniformity increases with greater cladding ratios and reaches 3% nonuniformity for cladding ratios of 20%.

Hence, a need remains for a method of producing bright sheet products in a continuous process which meets the surface quality requirements for bright sheet product with high uniformity in cladding ratio.

SUMMARY OF THE INVENTION

This need is met by the clad bright sheet product of the present invention manufactured without hot rolling thick ingot with a thick cladding down to a desired gauge of the sheet. Specifically, the present invention includes a roll cast clad bright product having a roll cast core of a first aluminum alloy and a clad layer of a second aluminum alloy bonded to one side of the core, the second aluminum alloy containing at least about 99.5 wt. % aluminum.

The first alloy preferably is an alloy of the AA series 1XXX, 3XXX, 5XXX or 8XXX. The second alloy preferably contains at least about 99.8 wt. % aluminum and may be one of AA alloys 1085, 1090, 1095, 1198 and 1199. The solidus temperature of the first aluminum alloy is lower than the solidus temperature of the second alloy.

The bright product of the present invention may be less than about 2.5 mm thick, preferably about 0.3–1 mm thick. The clad layer preferably accounts for about 5 to about 20% of the thickness of the bright product, more preferably about 10 to about 15% of the thickness of the bright product.

BRIEF DESCRIPTION OF THE DRAWINGS

A complete understanding of the invention will be obtained from the following description when taken in connection with the accompanying drawing figures wherein like reference characters identify like parts throughout.

DETAILED DESCRIPTION OF THE INVENTION

For purposes of the description hereinafter, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Figure 1:
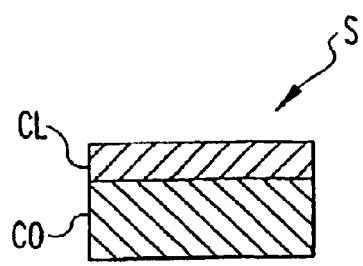
FIG. 1 is a schematic cross section of the sheet product of the present invention.

As shown in FIG. 1, the present invention includes bright sheet product S having a core layer CO and a cladding layer CL on one side thereof produced by laminating the cladding alloy onto the core material in a roll caster. The material of the core layer CO preferably is a first aluminum alloy of the AA series 1XXX, 3XXX, 5XXX or 8XXX. Particularly preferred alloys for the core layer CO are alloy AA 1050 and alloy AA 1200. The core alloy of AA 1050 may further include 0.7 wt. % manganese. For obtaining a bright product, the material of the cladding layer CL should be a second aluminum alloy with at least about 99.5 wt. % aluminum, more preferably at least about 99.8 wt. % aluminum. Particularly preferred alloys for the clad layer CL are AA alloys 1085, 1090, 1095, 1198 and 1199. The solidus temperature of the first aluminum alloy preferably is lower than the solidus temperature of the second alloy.

The bright sheet product S of the present invention preferably is less than about 2.5 mm thick, more preferably about 0.3 to about 1 mm thick. Preferably, the cladding ratio is about 5 to 20%, more preferably about 10 to about 15%. The cladding ratio varies along a strip produced according to the present invention by less than about 1%.

Figure 2:
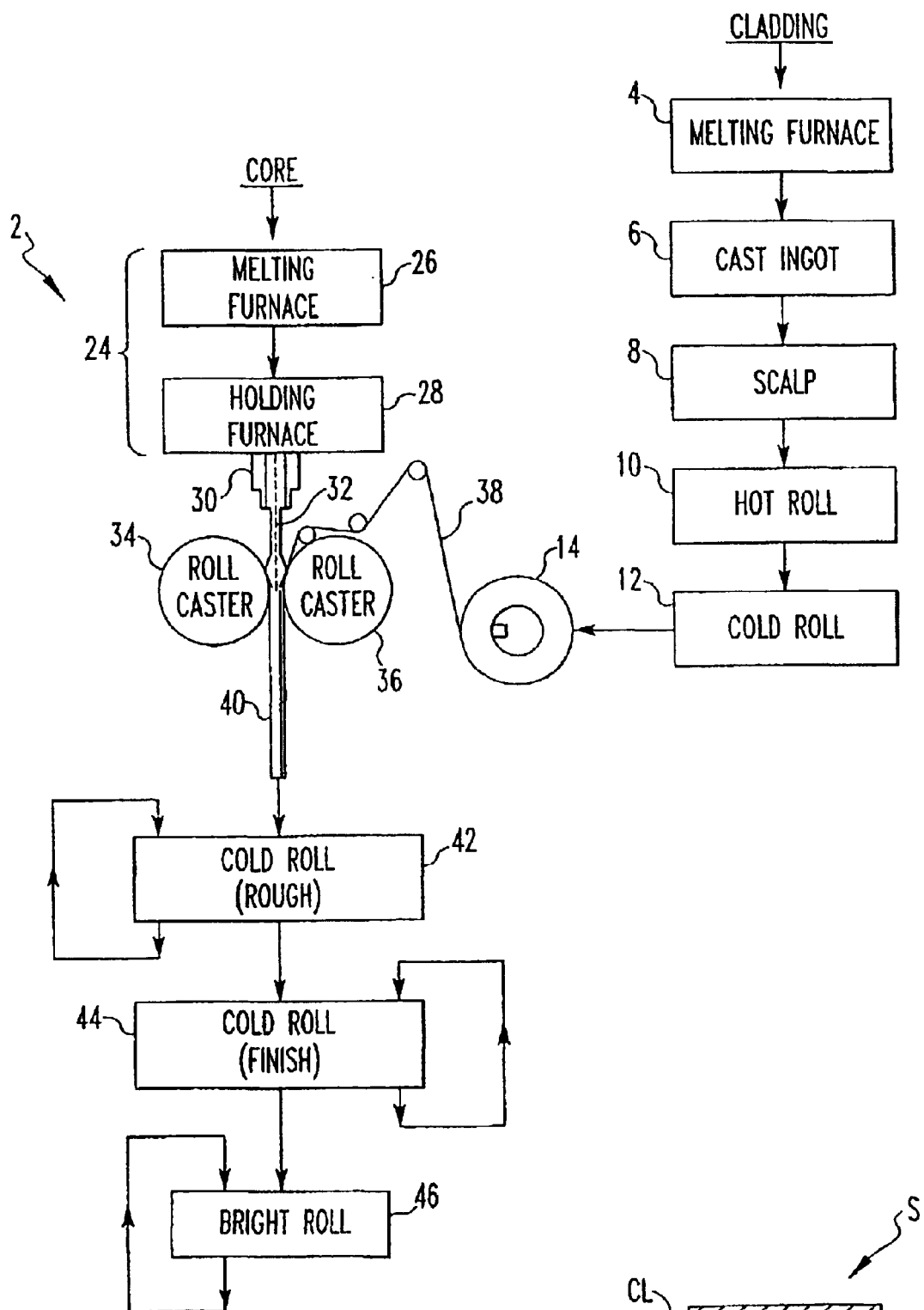
FIG. 2 is a schematic flow path of a method of producing the sheet product of the present invention.

The bright sheet of the present invention is produced in the process 2 schematically presented in FIG. 2. The clad layer CL is produced by providing a melt of the clad alloy in step 4 and casting the clad alloy in step 6 into an ingot in a specialized furnace to avoid contamination of detrimental elements such as iron and silicon and to maintain purity. Strict control of the casting parameters in the casting operation is desirable in order to achieve a uniform grain size and structure. Each side of the cast clad ingot is scalped in step 8 (e.g., by about 12 mm) to remove surface oxidation and cortical zone and the scalped ingot is hot rolled (e.g., to about 8 mm) with edge trimming in step 10. The rolled product is further reduced by cold rolling (e.g., to about 0.5 to about 2 mm) in step 12 and preferably is coiled into a coil 14.

In step 24, a melt of the core alloy is charged from a melting furnace 26 into a holding furnace 28, passes through a tundish 30 and is delivered via a nozzle 32 to a roll bite between a pair of rolls 34 and 36. Preferably, a strip of the core alloy alone is first produced to stabilize the casting process. The coil 14 of the clad layer CL is unwound and a band 38 of the clad layer CL is introduced into the roll bite in close contact with one of the rolls 34 and 36. A strip 40 exiting the rolls 34 and 36 includes the clad layer CL laminated onto the core layer CO. The temperature of the melt of the core alloy, the cooling by the rolls 34 and 36, the tension in the strip 40 and the tension in the band 38 of the clad layer CL from the coil 14 are adjusted to stabilize the combined cladding and casting process. In order to obtain the desired thickness of the strip, desired cladding ratio and good adhesion between the clad layer CL and the core layer CO, it is preferred that the core molten metal temperature in the tundish 30 is maintained within a close range e.g., of about 680 to 720° C., the speed of the rolls 34 and 36 is about 0.9 to 1.2 m/min, the casting speed is about 1.1 to 1.3 m/min, the tension in the band 38 is about 30 to 50 Mpa, and the speed of the band 38 is about 0.7 to 1.0 m/min. The strip 40 preferably is about 5 to about 6 mm thick with a cladding ratio of about 7 to 15%.

In step 42, the strip 40 is cold rolled in one or more passes using rolls having a roughness of about A-40 to an intermediate thickness, e.g. of about 0.65 mm, and in step 44 the strip 40 is cold rolled in one or more passes with finishing rolls (roughness of about A-25) to achieve a final thickness, e.g. of about 0.45 mm. Preferably, the roughness of the rolls is progressively decreased as the material is rolled down. In step 46, the sheet 40 may be bright rolled in one or more passes using rolls with a very low roughness, i.e. rolls with mirror-like surfaces with a roughness Ra of about 0 microns. The final product may be about 0.4 mm thick with a gloss of greater than 75, preferably greater than 80 measured at 20 degrees. The final product may be further subjected to an electrobrightening and anodizing treatment in order to increase the brightness and the corrosion resistance so that the sheet is suitable for lighting applications.

The sheet produced according to the present invention has several advantages over the roll bonded products of the prior art. These advantages include higher mechanical properties, lower production costs by avoiding hot rolling passes and minimizing the number of cold rolling passes, and improved uniformity of cladding ratio in length and width. The continuous cladding process of the present invention makes changes in the composition of the core and clad alloys to produce different alloy combinations easier to accomplish.

Although the invention has been described generally above, the following example gives additional illustration of the product and process steps typical of the present invention.

EXAMPLE

Alloy AA 1200 was maintained in a tundish at about 700° C. The melt was continuously roll cast at about 1.2 m/min at a roll speed of about 1.1 m/min. A 1 mm thick strip of AA 1085 was continuously bonded to the cast alloy of AA 1200 at a reduction factor of about 0.6 according to the process described above. The chemical composition of the core alloy and the clad alloy were as listed in Table 1.

TABLE 1

| Alloy | Si | Fe | Cu | Mn | Mg | Cr | Ni | Zn | Ga | V | Ti | B |
| --- | --- | --- | --- | --- | --- | --- | --- | --- | --- | --- | --- | --- |
| Clad | .049 | .034 | <.001 | .002 | .005 | <.001 | .003 | .007 | .002 | .026 | .026 | .0011 |
| Core | .03 | .10 | .066 | .50 | .003 | <.001 | .003 | .017 | .015 | .006 | .007 | .0006 |

The strip exiting the caster was about 5 mm thick with a cladding ratio of about 10%. The cladding ratio at the center of the strip was determined to be essentially the same as the cladding ratio at the edges of the strip. A laboratory sized portion of the strip was rolled down to about 0.4 mm according to the process described above. The laboratory rolled strip was heat treated to determine resistance to blistering at 375° C. for 2 hours and at 500° C. for 2 hours.

Figure 3A:
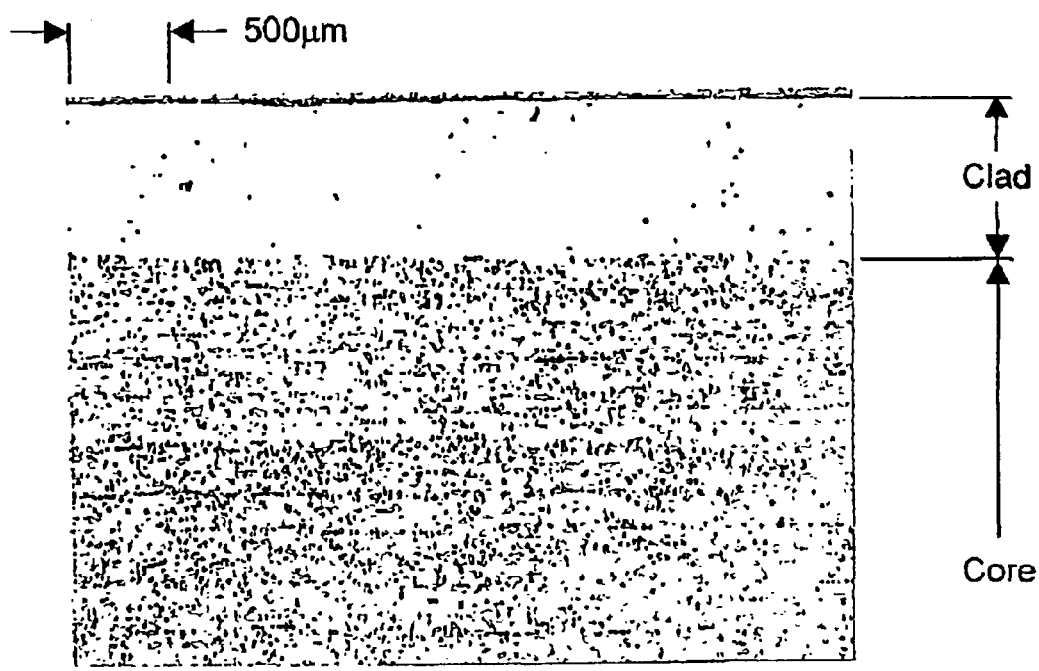
FIGS. 3a and 3b are photomicrographs of cross sections of the continuous clad product of Example 1 following two hour heat treatments of 375° C. and 500° C., respectively.
Figure 3B:
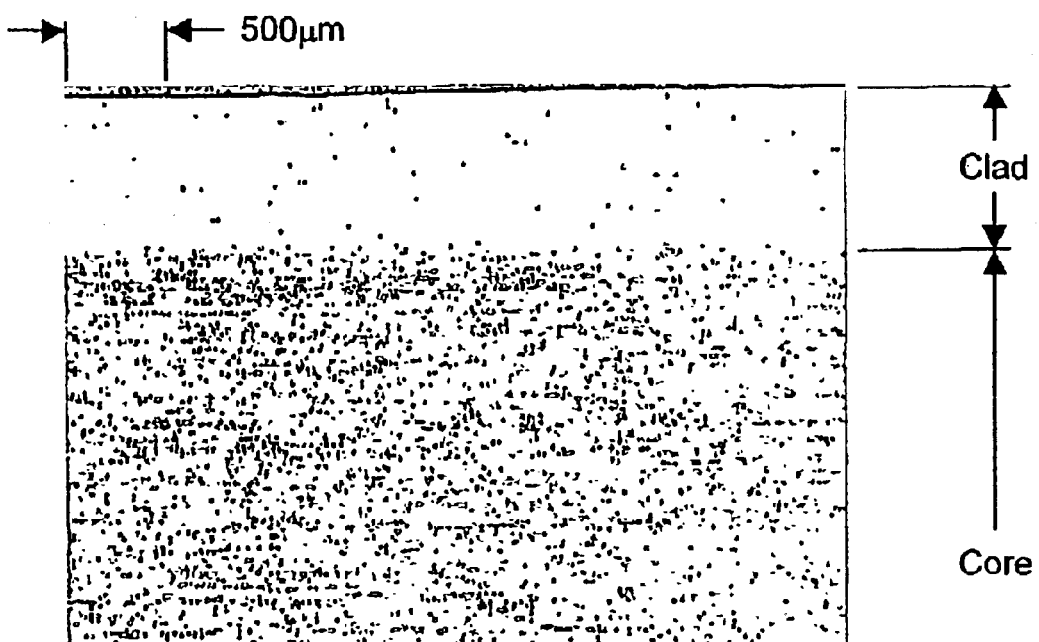

FIGS. 3a and 3b are transverse cross-sectional views of the strip following the thermal treatment at 375° for 2 hours and 500° for 2 hours, respectively. Both samples show excellent adhesion of the cladding layer CL (liner) to the core layer CO (core).

Figure 4A:
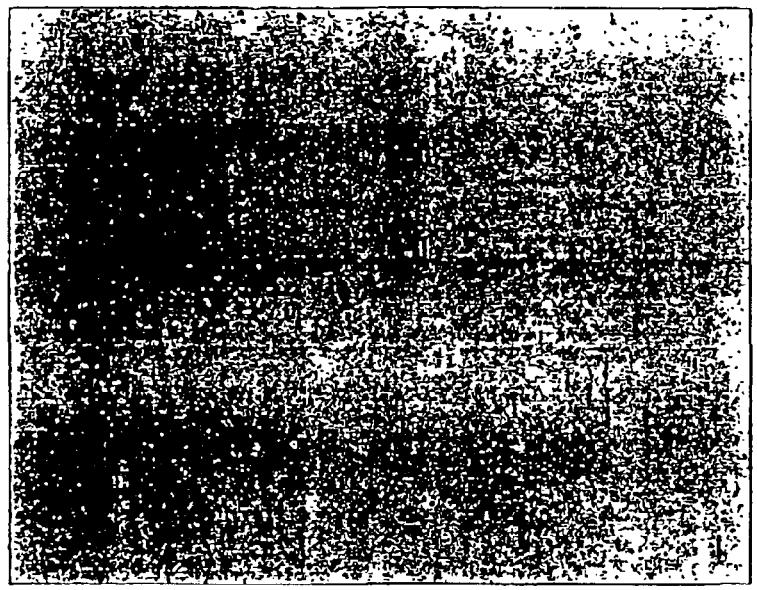
FIGS. 4a and 4b are photomicrographs of the surface of the product of Example 1 after bright rolling at magnifications of 32 times and 120 times, respectively.
Figure 4B:
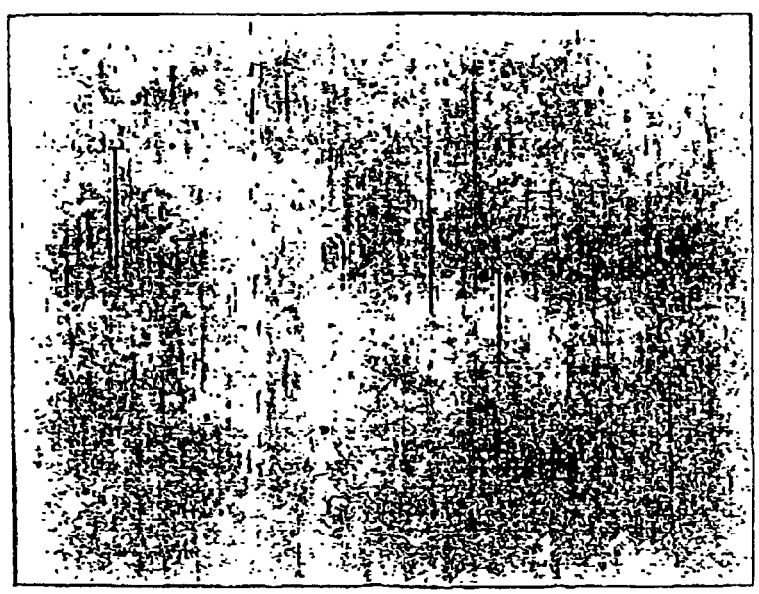

Samples of the strip were bright rolled. FIGS. 4a and 4b show the surface of the strip following bright rolling at 32 times and 120 times magnification, respectively. The strip exhibits high surface quality with minimal defects.

Figure 5A:
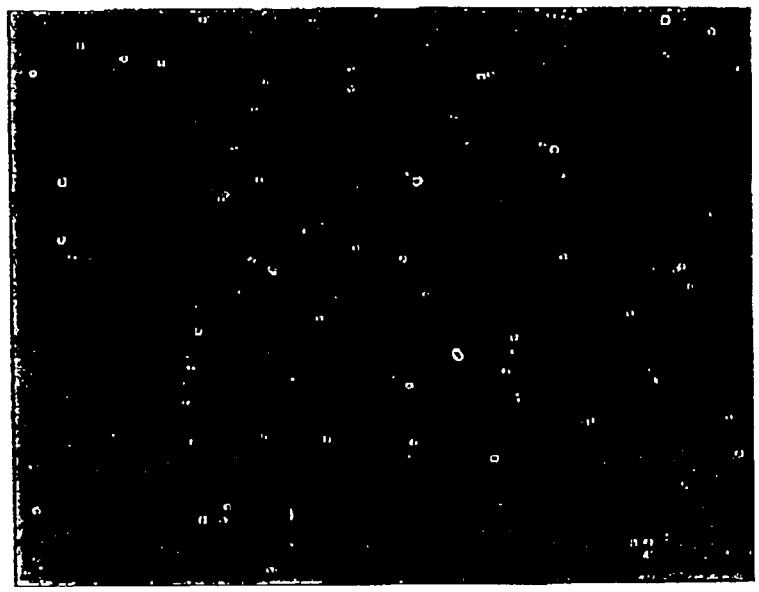
FIGS. 5a and 5b are photomicrographs of the surface of the product of Example 1 after electrobrightening and anodizing at magnifications of 32 times and 120 times, respectively.
Figure 5B:
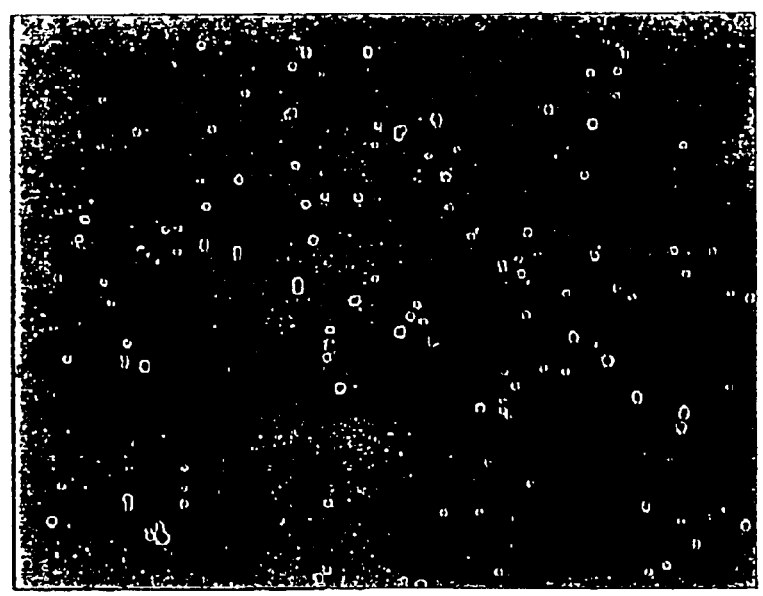

The bright rolled strip was further subjected to electro-brightening and anodizing treatments. In the electrobrightening treatment, the strip was submerged in a bath of phosphoric acid and 45% sulfuric acid at 58–60° C. for 75 seconds at a current density of 10–15 A/dm$^2$ and a voltage of about 20–23 volts. In the anodizing treatment, the strip was submerged in a bath of 15% sulfuric acid at 20° C. for 5 minutes at a current density of 0.8–1.0 A/dm$^2$ and a voltage of about 10–12 volts. The resulting bright surface is shown in FIGS. 5a and 5b at 32 times and 120 times magnification, respectively.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

What is claimed is:

1. A roll cast clad bright product comprising:
    a roll cast core comprising a first aluminum alloy, said first aluminum alloy being selected form the group consisting of AA series 1XXX, 3XXX, 5XXX and 8XXX; and
    a clad layer comprising a second aluminum alloy bonded to one side of said core, said second aluminum alloy comprising at least about 99.5 wt. % aluminum.

2. The bright product of claim 1, wherein said first alloy is selected from the group consisting of AA 1050 and AA 1200.

3. The bright product of claim 2, wherein said first alloy comprises an alloy of AA 1050 and an additional about 0.7 wt. % manganese.

4. The bright product of claim 1, wherein said second alloy comprises at least about 99.8 wt. % aluminum.

5. The bright product of claim 4, wherein said second alloy is selected from the group consisting of AA alloys 1085, 1090, 1095, 1198 and 1199.

6. The bright product of claim 1, wherein said bright product is less than about 2.5 mm thick.

7. The bright product of claim 6, wherein said bright product is about 0.3 to about 1 mm thick.

8. The bright product of claim 1, wherein said clad layer comprises about 5 to about 20% of the thickness of said bright product.

9. The bright product of claim 8, wherein said clad layer comprises about 10 to about 15% of the thickness of said bright product.

10. A roll cast clad bright product comprising:
    a roll cast core comprising a first aluminum alloy; and
    a clad layer comprising a second aluminum alloy bonded to one side of said core, wherein the solidus temperature of said first aluminum alloy is lower than the solidus temperature of said second alloy.

11. The bright product of claim 10, wherein said bright product is less than about 2.5 mm thick.

12. The bright product of claim 10, wherein said first aluminum alloy is selected from the group consisting of AA series 1XXX, 3XXX, 5XXX and 8XXX and said second alloy comprises at least about 99.5 wt. % aluminum.

13. A roll cast clad bright product consisting essentially of:
    a roll cast core comprising a first aluminum alloy; and
    a clad layer comprising a second aluminum alloy bonded to one side of said core, said second aluminum alloy comprising at least about 99.5 wt. % aluminum.

14. The bright product of claim 13, wherein said first alloy is selected from the group consisting of AA series 1XXX, 3XXX, 5XXX and 8XXX.

15. The bright product of claim 14, wherein said first alloy is selected from the group consisting of AA 1050 and AA 1200.

16. The bright product of claim 13, wherein said second alloy comprises at least about 99.8 wt. % aluminum.

17. The bright product of claim 16, wherein said second alloy is selected from the group consisting of AA alloys 1085, 1090, 1095, 1198 and 1199.

18. The bright product of claim 13, wherein said bright product is less than about 2.5 mm thick.

19. The bright product of claim 18, wherein said clad layer comprises about 5 to about 20% of the thickness of said bright product.

20. The bright product of claim 19, wherein said clad layer comprises about 10 to about 15% of the thickness of said bright product.

* * * * *